United States Patent
Tu et al.

(10) Patent No.: US 12,531,563 B2
(45) Date of Patent: Jan. 20, 2026

(54) FREQUENCY OFFSET OF A CLOCK SIGNAL

(71) Applicant: STMicroelectronics International N.V., Geneva (CH)

(72) Inventors: Cao-Thong Tu, Lausanne (CH); David Cousinard, Morges (CH); David Champion, Founex (CH); Matteo Contaldo, Chavannes-pres-Renens (CH)

(73) Assignee: STMicroelectronics International N.V., Geneva (CH)

( * ) Notice: Subject to any disclaimer, the term of this patent is extended or adjusted under 35 U.S.C. 154(b) by 23 days.

(21) Appl. No.: 18/616,951

(22) Filed: Mar. 26, 2024

(65) Prior Publication Data
US 2024/0333292 A1 Oct. 3, 2024

(30) Foreign Application Priority Data
Mar. 31, 2023 (FR) ........................ 2303142

(51) Int. Cl.
*H03L 7/195* (2006.01)
*H03L 7/081* (2006.01)

(52) U.S. Cl.
CPC ............ *H03L 7/195* (2013.01); *H03L 7/0818* (2013.01)

(58) Field of Classification Search
None
See application file for complete search history.

(56) References Cited

U.S. PATENT DOCUMENTS

| | | | |
|---|---|---|---|
| 4,381,461 A * | 4/1983 | Steensma | H03B 21/02 327/107 |
| 6,850,121 B1 | 2/2005 | Detering et al. | |
| 2009/0304044 A1 | 12/2009 | Van De Beek et al. | |
| 2011/0140760 A1 | 6/2011 | Krivokapic et al. | |

OTHER PUBLICATIONS

Coates Eric : "Integrators", Dec. 29, 2020, pp. 1-2, XP093090175.
INPI Search Report and Written Opinion for priority application, FR Appl. No. 2303142, report dated Oct. 10, 2023, 12 pgs.

\* cited by examiner

*Primary Examiner* — Cassandra F Cox
(74) *Attorney, Agent, or Firm* — Crowe & Dunlevy LLC

(57) ABSTRACT

An electronic device applies a frequency offset function to a first signal having a first frequency. The device includes a delay element configured to output a second signal corresponding to the first signal delayed by a duration equal to a first period of said signal divided by four. A circuit branch includes a first circuit configured to divide the frequency of the first signal by a given number coupled in series with a second circuit configured to implement an integration. The circuit branch outputs a third signal and a fourth signal. A single side band mixing circuit processes the first signal, second signal, third signal and fourth signal to generate an output signal.

22 Claims, 3 Drawing Sheets

FREQUENCY OFFSET OF A CLOCK SIGNAL

PRIORITY CLAIM

This application claims the priority benefit of French Application for Patent No. 2303142, filed on Mar. 31, 2023, the content of which is hereby incorporated by reference in its entirety to the maximum extent allowable by law.

TECHNICAL FIELD

The present disclosure relates generally to the radiofrequency transmission of data and to the treatment of signals. The present disclosure relates more specifically to the creation of a frequency offset function for a signal (i.e., a clock signal) generated by a local oscillator.

BACKGROUND

Signal analysis and treatment techniques are used nowadays to optimize the transmission of data.

It is advisable to improve, at least partially, some aspects of the treatment and transmission of signals.

There is a need for more performing data transmission.

There is a need for more effective signal transmission.

There is a need to implement a more effective frequency offset function for a clock signal.

There is a need to addresses all or some of the drawbacks of known data transmission chains.

SUMMARY

One embodiment implements frequency offsets of clock signals.

In an embodiment, an electronic device configured to apply a frequency offset function to a first signal that has a first frequency comprises: a delay element configured to output a second signal corresponding to the first signal offset by a duration equal to a first period of said first signal divided by four; a circuit branch that comprises a first circuit configured to divide the frequency of the first signal by a given number coupled with a second circuit configured to integrate an output of the first circuit, wherein said circuit branch is configured to output a third signal and a fourth signal; and a third circuit configured to perform single side band mixing to combine the first signal, the second signal, the third signal and the fourth signal to output a fifth signal.

According to an embodiment said first circuit is configured to output a sixth signal that is in quadrature of the first signal, whose frequency is divided by said number, wherein the third signal is generated by said second circuit integrating the sixth signal.

According to an embodiment, said first circuit is configured to further output a seventh signal corresponding to the first signal, whose frequency is divided by said number, and wherein said circuit branch further comprises a fourth circuit configured to integrate the seventh signal and to output the fourth signal.

According to an embodiment, the device further comprises a fifth circuit configured to change a sign of said second signal to output an eighth signal.

According to an embodiment, the fifth signal is provided by the following mathematical formula:

$$\text{Mix\_F\_offset}(t) = \text{Clk\_F}(t) * \text{I\_comp}(t) + \text{Clk\_F\_Q}(t) * Q\_\text{comp}(t)$$

Wherein: Mix_F_offset(t) is the fifth signal; Clk_F(t) is the first signal; I_comp(t) is the fourth signal; Clk_F_Q(t) is the eight signal; and Q_comp(t) is the third signal.

According to an embodiment, said fifth circuit is controllable.

According to an embodiment, the number is a multiple of two.

According to an embodiment, the number is a multiple of four.

According to an embodiment, said delay element is a programmable delay element.

According to an embodiment, the first signal is a clock signal.

Another embodiment comprises a transmission chain for a signal that includes a device as previously described.

According to an embodiment, the chain further comprises: a frequency generator; a modulator on carrier frequency; and a power amplifier circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
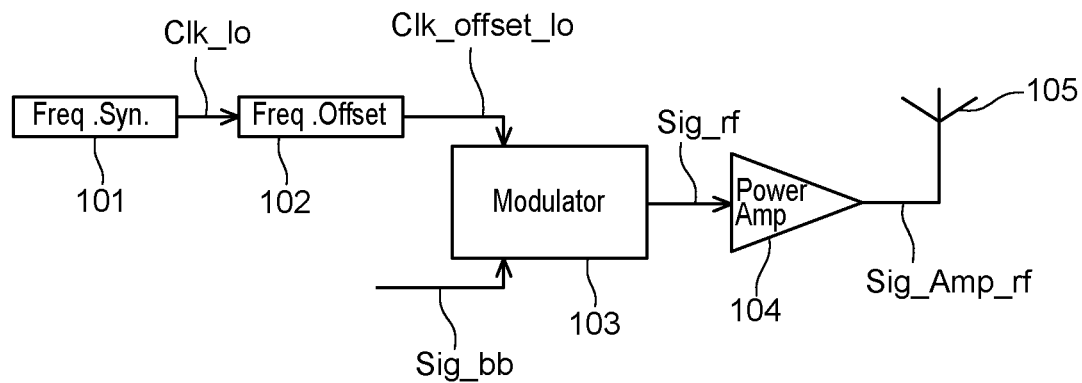
FIG. 1 very schematically illustrates as a block diagram an embodiment of a part of the data transmission chain.

FIG. 1 very schematically illustrates as a block diagram an embodiment of a part 100 of a radiofrequency data transmission chain. In other words, FIG. 1 illustrates an embodiment of a part of the transmission chain configured to transmit data using signals, whose frequency is between 3 kHz and 300 GHz.

The part 100 of the transmission chain comprises: a frequency generator circuit 101 (Freq Syn); an embodiment of a device 102 (Freq Offset) configured to implement a frequency offset function for an input clock signal; a modulator on carrier frequency 103 (Modulator); a power amplifier circuit 104 (Power Amp); and an antenna 105.

The frequency generator circuit 101 or frequency synthesizer is a circuit configured to generate a clock signal, which means a constant frequency signal, preferably a constant frequency square signal or constant frequency rectangular signal. According to an example, the frequency generator circuit is a local oscillator. According to an example, the circuit 101 is a phase-locked loop (PLL). Thus, in FIG. 1, the circuit 101 outputs a square periodic clock signal Clk_lo with a constant frequency F_lo.

It will be understood, for the rest of the disclosure, that a clock signal with a frequency F is a square periodic signal with a period of 1/F. Hereafter, signals whose frequency starts with Clk are clock signals. In addition, an ideal clock signal Clk(t) with a frequency F is given by the following mathematical formula:

$$Clk(t) = \text{sign}(\sin(2\pi Ft + \phi_0))$$

wherein $\phi_0$ is the initial phase, and the sign mathematical function is given by the following mathematical formula:

$$\text{sign}(x) = \begin{cases} 1 \text{ if } x \geq 0 \\ \text{else} - 1 \end{cases}$$

The device 102 implements an input frequency offset function of the clock signal Clk_lo. Thus, the device 102 receives in input the clock signal Clk_lo with a frequency F_lo and outputs a square clock signal Clk_offset_lo with a frequency F_offset_lo. An embodiment of the device 102 is described more in detail with the FIG. 2.

The clock signal Clk_offset_lo results from a single side band mixing (SSB Mixing) of the clock signal Clk_lo with a signal corresponding to the clock signal Clk_lo, whose frequency F was divided by an integer N. Thus, the frequency F_offset_lo of the clock signal Clk_offset_lo results from the following mathematical formula:

$$F_{offset_{lo}} = F_{lo} + \text{sign}_{offset}\left(\frac{F_{lo}}{N}\right)$$

wherein the function sign_offset is a controllable sign function that is equal to 1 or −1.

The modulator on carrier frequency 103 receives in input a data signal Sig_bb (i.e., a baseband data signal) and the clock signal Clk_offset_lo and produces an output modulated signal Sig_rf. The Sig_bb signal is the signal to transmit, which comprises data, for example. This signal is also called baseband signal. The Clk_offset_lo clock signal is used as a carrier signal. In other words, the frequency F_offset_lo is the carrier frequency of the modulated signal Sig_bb.

According to a variant, the clock signal Clk_offset_lo may undergo a possible frequency division by an integer K before using as a carrier signal. In this case, the carrier frequency of the modulated signal Sig_rf is equal to the frequency F_offset_lo divided by the integer K.

The power amplifier circuit 104 receives in input the modulated signal Sig_rf and outputs an amplified modulated signal Sig_amp_rf. The power amplifier circuit 104 can, in some architectures, generate a coupling with the frequency generator circuit 101. Using the device 102 prevents this phenomenon by preventing harmonics of the signal Sig_rf, whose frequencies are integer multiples of the frequency F_rf of the signal Sig_rf, from matching the clock signal Clk_lo with the frequency F_lo.

The antenna 105 receives the amplified modulated signal Sig_amp_rf and transmits it.

Figure 2:
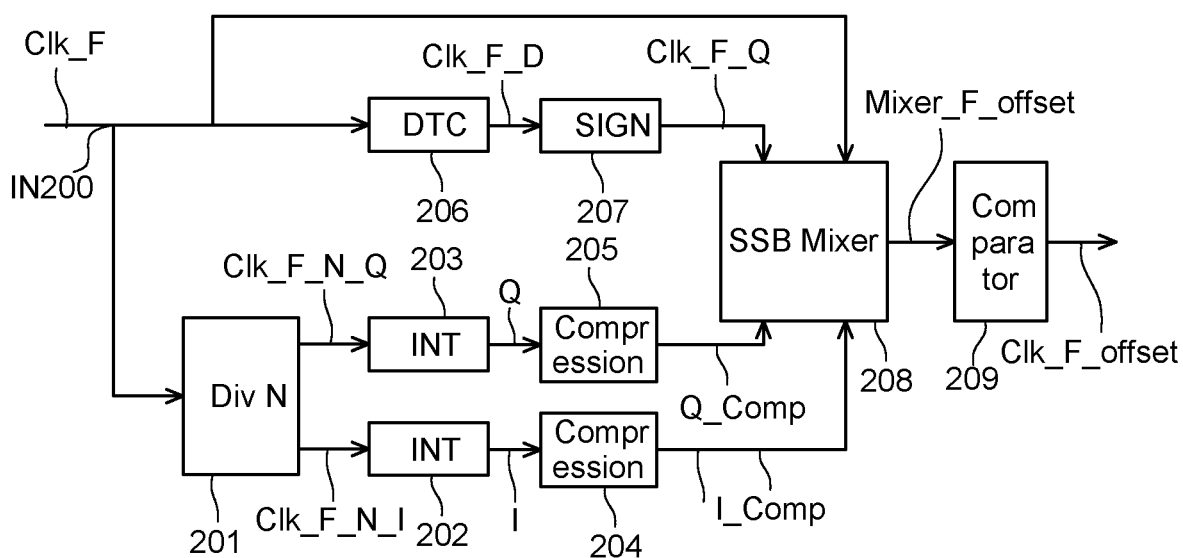
FIG. 2 very schematically illustrates as a block diagram an embodiment of a device that implements a frequency offset operation for a clock signal.

FIG. 2 schematically illustrates, as a block diagram, an embodiment of a device 200 that is configured to implement a frequency offset function such as for the device 102 described in relationship with FIG. 1.

The device 200 comprises an input node IN200 configure to receive a clock signal Clk_F with a frequency F.

The device 200 comprises a circuit branch including, in the following order: a frequency divider circuit 201 (DIV N); two integrator circuits 202 (INT) and 203 (INT); and two optional circuits 204 (COMP) and 205 (COMP) configured to apply a compression function to the outputs of the circuits 202 and 203, respectively.

The frequency divider circuit 201 receives in input the clock signal Clk_F and outputs two signals Clk_F_N_I and Clk_F_N_Q. The clock signal Clk_F_N_I corresponds to the signal Clk_F, whose frequency was divided by an integer N. The resulting frequency is noted F_N. The clock signal Clk_F_N_Q corresponds to the quadrature of the clock signal Clk_F_N_I. Practically, the clock signal Clk_F_N_Q is a delayed version by a duration Tau_N of the signal Clk_F_N_I. The clock signal Clk_F_N_Q(t) is given by the following mathematical formula:

$$Clk\_F\_N\_Q(t) = Clk\_F\_N\_I(t - Tau\_N)$$

For a perfect quadrature between the clock signals Clk_F_N_I and Clk_F_N_Q, the time offset Tau_N is given by the following mathematical formula:

$$Tau_N = \frac{N*T}{4}$$

where T is the period of the signal clk_F, which means the inverse of the frequency F.

The value of the integer N can be controllable. According to an embodiment, the number N is a multiple of two. According to a preferential embodiment, the number N is a multiple of four. In this case, the duration Tau_N is a whole number of periods T.

The integrator circuit 202 receives, in input, the clock signal Clk_F_N_I, and outputs an in phase analog signal I. The output signal I results from the integration in time of the clock signal Clk_F_N_I. Thus, practically, since the clock signal Clk_F_N_I is a square signal with a frequency F_N, the signal I is a triangle wave signal with a frequency F_N.

The integrator circuit 203 receives, in input, the clock signal Clk_F_N_Q, and outputs a quadrature phase analog signal Q. The signal Q results from the integration in time of the clock signal Clk_F_N_Q. Thus, theoretically since the clock signal Clk_F_N_Q is an offset version of the duration Tau_N of the clock signal Clk_F_N_I, the signal Q is a delayed version of the duration Tau_N of the signal I. In other words, the signal Q(t) results from the following mathematical formula:

$$Q(t) = I(t - \text{Tau\_N})$$

The circuit 204 that is designed to optionally apply a time compression function receives, in input, the signal I, and outputs a signal I_comp. A well selected compression function, this selection is available to a person skilled in the art, outputs a signal close to a sinusoidal wave (i.e., a signal that is pseudo-sinusoidal). The signal I_comp(t) is given by the following mathematical formula:

$$I_{comp(t)} = Gcomp(I(t))$$

where Gcomp is the compression function.

Figure 4:
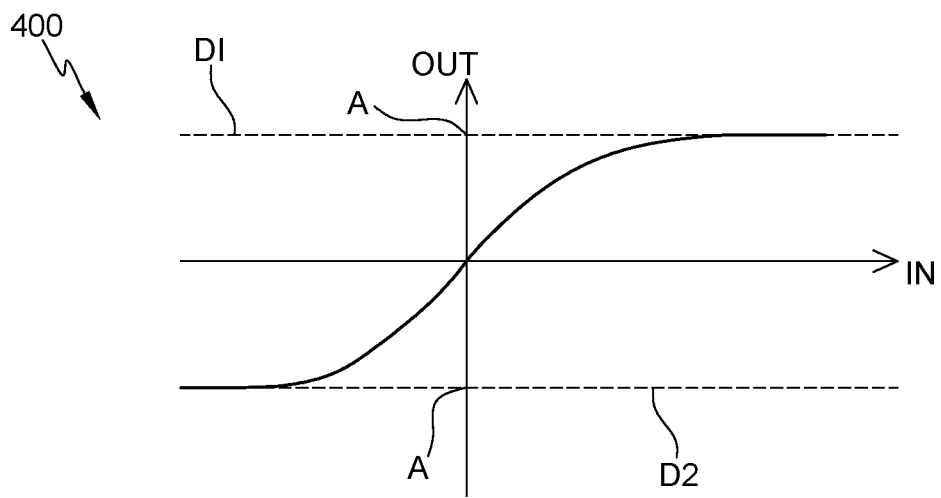
FIG. 4 is a diagram that illustrates an example of compression function used in the embodiment of FIG. 2.

An example of a compression function implemented by the circuits 204 and 205 is described in relationship with FIG. 4.

The circuit 205 is the same as the circuit 204 and is configured to apply the compression function Gcomp as described above. The circuit 205 receives in input the signal Q and outputs a (pseudo-sinusoidal) signal Q_comp. Theoretically, since the signal Q is a delayed version of the duration Tau_N of the signal I, the signal Q_comp is thus a delayed version of the duration Tau_N of the signal I_comp. In other words, the signal Q_comp(t) is given by the following mathematical formula:

$$Q\_comp(t) = I\_comp(t - \text{Tau\_N})$$

It will be noted that an advantage of including the circuits 204 and 205 to apply compression to the signals I and Q, respectfully, output from integrator circuits 202 and 203, is that this enables the device to accept an input signal at any signal frequency. Furthermore, improved performance in terms of spectral purity, lower power consumption and smaller footprint may accrue.

The device 102 further comprises a delay element 206 (DTC) configured to chronologically offset a signal by a duration Tau. The delay element receives in input the clock signal Clk_F and outputs a delayed clock signal Clk_F_D. Thus, the clock signal Clk_F_D(t) is given by the following mathematical formula:

$$\text{Clk\_F\_D}(t) = \text{Clk\_F}(t - \text{Tau})$$

According to an embodiment, the duration Tau is given by the following mathematical formula:

$$\text{Tau} = \frac{T}{4}$$

In addition, and according to an embodiment, the delay element 206 is configurable. In particular, the duration Tau is configurable, which allows the device 102 to adapt to any input frequency F.

The device 102 further and optionally comprises a sign change circuit 207 (SIGN). The sign change circuit 207 makes it possible to define the operation implemented by the function sign_offset described above. More specifically, the circuit 207 makes it possible to assess whether the frequency of the signal in output of the device 200 is equal to the sum or to the difference of the frequencies F and F_N. According to an example, if the device 200 outputs a signal, whose frequency is the result of a difference, then the function sign_offset is equal to minus one and the sign change circuit is not present. According to an example, if the device 200 outputs a signal, whose frequency is the result of a sum, then the function sign_offset is equal to one and the sign change circuit makes it possible to inverse the sign of the signal it receives. According to another example, the circuit 207 can be a controllable circuit that makes it possible, from a control signal, to inverse or not the sign of the clock signal that it receives or not.

Thus, the sign change circuit 207 receives, in input, the clock signal Clk_F_D, and outputs a clock signal Clk_F_Q. The signal Clk_F_Q matches the clock signal Clk_F with a reversed sign or not. The signal Clk_F_Q(t) is given by the following mathematical formula:

$$\text{Clk\_F\_Q}(t) = -\text{sign\_offset} * \text{Clk\_F\_D}(t)$$

The device 102 further comprises a single side band mixing circuit 208 (SSB Mixer), which is used to modulate the quadrature analogical signals I_comp and Q_comp by the clock signals Clk_F and Clk_F_Q, by outputting the signal Mix_F_offset. Theoretically, the single side band mixing circuit implements the operation of the following mathematical equation:

$$\text{Mix\_F\_offset}(t) = \text{Clk\_F}(t) * \text{I\_comp}(t) + \text{Clk\_F\_Q}(t) * \text{Q\_comp}(t)$$

According to a variant, the compression functions of the circuits 204 and 205 are directly implemented by the circuit 208.

The output signal Mix_F_offset is, by design, a periodic analog signal with the frequency F_N. But most of the power of this signal is concentrated in the harmonic wave of the signal Mix_F_offset, whose frequency F_offset is given by the following equation:

$$\text{F\_offset} = F + \text{sign\_offset} * \frac{F}{N}$$

Eventually, the device 102 comprises a clock regeneration device 209 that outputs the clock signal Clk_F_offset from the input analogical signal Mix_F_offset by comparison with zero. The signal Clk_F_offset(t) is given by the following mathematical formula:

$$\text{Clk\_F\_offset}(t) = \text{sign}(\text{Mix\_F\_offset}(t))$$

The clock signal regeneration circuit 209 incorporates a filter before the comparison with zero in order to improve the spectral purity of the clock signal Clk_F_offset. In this case, the signal Clk_F_offset(t) is given by the following mathematical formula:

$$\text{Clk\_F\_offset}(t) = \text{sign}(h(t) \otimes \text{Mix\_F\_offset}(t))$$

where h(t) is the impulse response of the filter.

Figure 3:
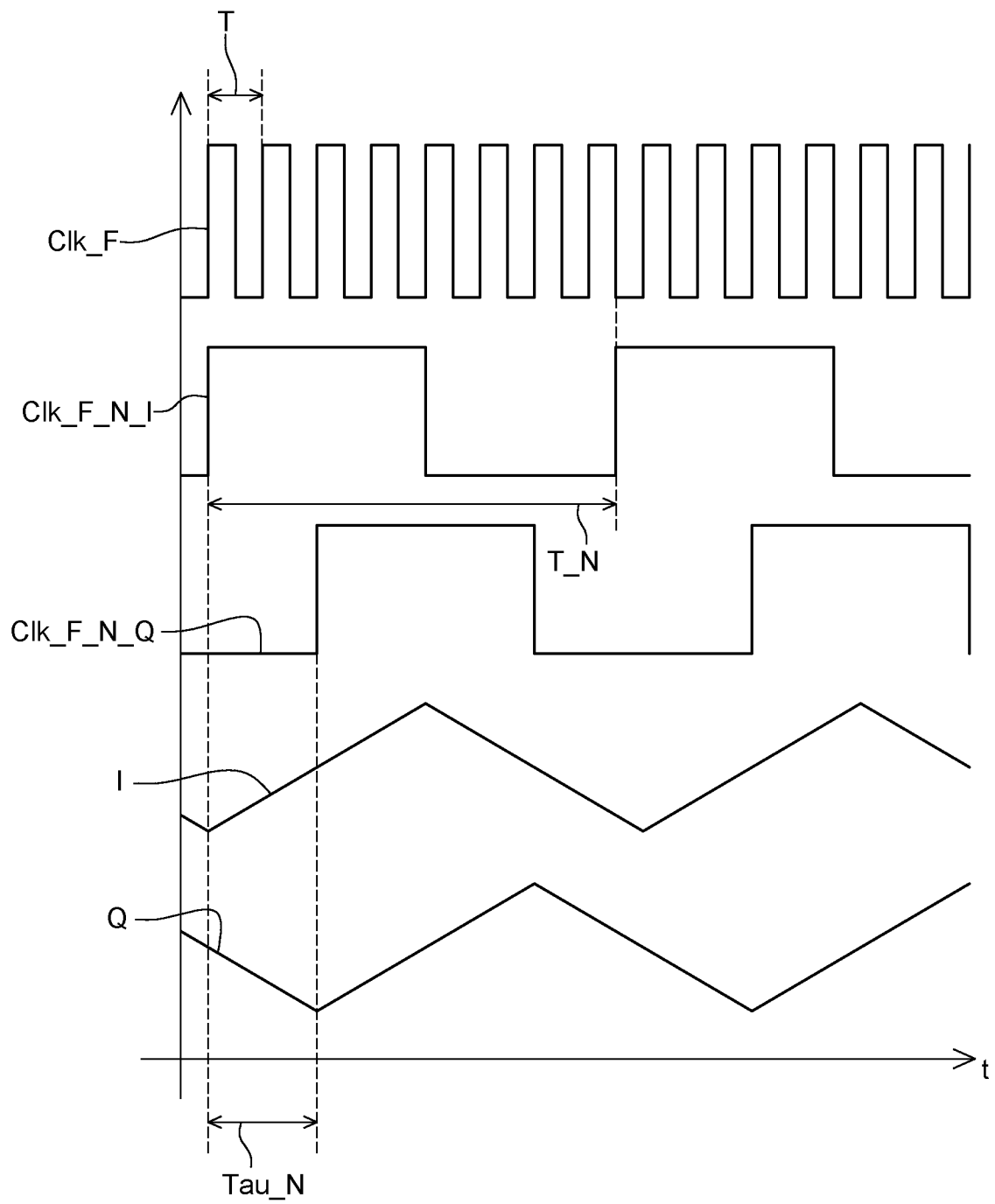
FIG. 3 shows time diagrams that illustrate the functioning of the embodiment of FIG. 2.
Figure 5:
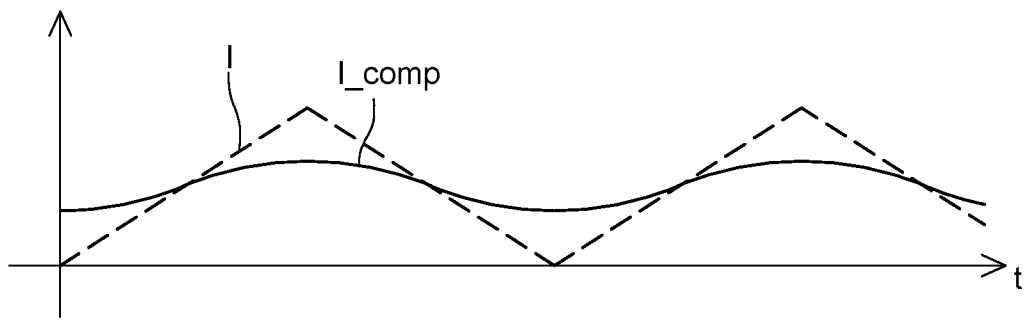
FIG. 5 shows another time diagram that illustrates the functioning of the embodiment of FIG. 2.

The operation of the device 200 is illustrated more in details in relationship with the time diagrams of FIGS. 3 and 5 and with the graphic of FIG. 4.

FIG. 3 comprises time diagrams that illustrate a practical example of operation of the device 200 as described in relationship with FIG. 2.

FIG. 3 comprises the following time diagrams: a time diagram referenced Clk_F that illustrates the evolution in time of the clock signal Clk_F as described in relationship with FIG. 2; a time diagram referenced Clk_F_N_I that illustrates the evolution in time of the clock signal Clk_F_N_I as described in relationship with FIG. 2; a time diagram referenced Clk_F_N_Q that illustrates the evolution in time of the clock signal Clk_F_N_Q as described in relationship with FIG. 2; a time diagram referenced I that illustrates the evolution in time of the signal I as described in relationship with FIG. 2; and a time diagram referenced Q that illustrates the evolution in time of the signal Q as described in relationship with FIG. 2.

As previously said, the clock signal Clk_F is a clock signal with a frequency F and a period T.

The clock signals Clk_F_N_I and Clk_F_N_Q are also periodic square signals. However, since the clock signals Clk_F_N_I and Clk_F_N_Q are output signals of the circuit 201, their frequency is the frequency F_N, and their period is the duration T_N equal to the period T multiplied by the integer N. In FIG. 3, the integer N is equal to eight. The clock signal Clk_F_N_Q is temporarily offset relatively to the clock signal Clk_F_N_I by the time offset Tau_N as described above.

The signals I and Q are periodic triangle wave signals. However, since the signals I and Q result from the integration of the clock signals Clk_F_N_I and Clk_F_N_Q, their frequency is the frequency F_N and their period is a duration T_N. The Q signal is temporarily offset relatively to the signal I by the time offset Tau_N as described above.

FIG. 4 is a graph 400 that illustrates the evolution of a compression function Gcomp implemented by the circuits 204 and 205 in relationship with FIG. 2.

The abscissa axis of the graph 400 shows the value of amplitude of the input signal. The ordinate axis shows the amplitude of the input signal transformed by the function Gcomp.

According to an example, the function Gcomp is a function of the type hyperbolic tangent.

FIG. 5 comprises two time diagrams that illustrate an practical example of operation of the device 200 as described in relationship with FIG. 2.

FIG. 5 comprises the following time diagrams: the dotted time diagram referenced I that illustrates the evolution in time of the signal I as described in relationship with FIG. 2; and a time diagram referenced I_comp that illustrates the evolution in time of the signal I_comp as described in relationship with FIG. 2.

As previously described, the signal I is a period triangle wave signal.

The signal I_comp corresponds to the application of the compression function of the circuit 204 to the signal I. As previously described, the signal I_comp is a pseudo-sinusoidal signal with a frequency equal to the frequency F_N.

Similarly, the signal I_comp, not illustrated, is a pseudo-sinusoidal wave, has a frequency equal to the frequency F_N and has a time offset equal to the duration Tau_N relatively to the signal I_comp.

Figure 6:
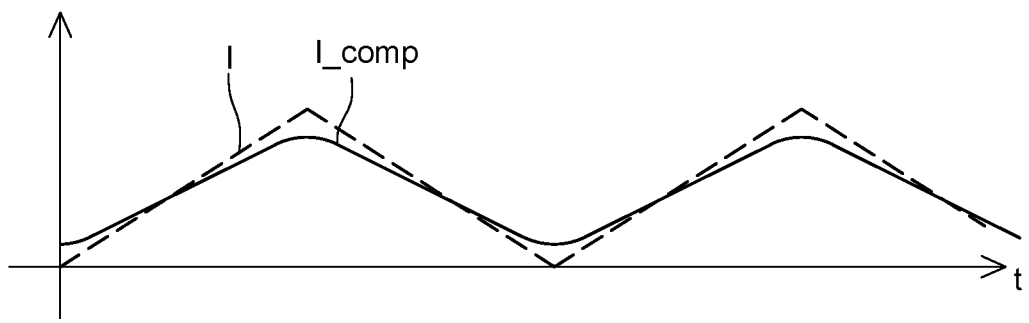
FIG. 6 shows a further time diagram that illustrates the functioning of the embodiment of FIG. 2.

FIG. 6 is a timing diagram illustrating another practical example of operation of the device 200 described in relation to FIG. 2.

Like FIG. 5, FIG. 6 includes the following timing diagrams: a chronogram referenced I, in dotted line, representing the temporal evolution of the signal I described in relation to FIG. 2; and a chronogram referenced I_comp representing the temporal evolution of the signal I_comp described in relation to FIG. 2.

As described previously, the signal I is a periodic signal of triangular shape.

The signal I_comp corresponds to the application of the compression function of circuit 204 to the signal I. As said previously, the signal I_comp is a signal whose shape is pseudo-sinusoidal and has a frequency equal to the frequency F_N.

Similarly, the signal I_comp, not shown in FIG. 6, has a pseudo-sinusoidal shape, has a frequency equal to the frequency F_N, and has a time offset equal to the duration Tau_N relative to the signal I_comp.

Unlike FIG. 5, in FIG. 6, the signal I_comp has a shape which more closely matches the shape of the triangular signal I.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. An electronic device configured to apply a frequency offset function to a first signal having a first frequency, comprising:
   a delay element configured to output a second signal corresponding to the first signal offset by a duration equal to a first period of said first signal divided by four;
   a circuit branch including a first circuit configured to divide the frequency of the first signal by a dividing number and coupled to a second circuit configured to integrate an output of the first circuit, wherein said circuit branch is configured to output a third signal and a fourth signal; and
   a third circuit configured to perform a single side band mixing to combine the first signal, the second signal, the third signal and the fourth signal to output a fifth signal.

2. The device according to claim 1, wherein said first circuit is configured to output a sixth signal that is in quadrature phase of the first signal, with a frequency that is divided by said number, wherein the third signal is generated by integrating the sixth signal by said second circuit.

3. The device according to claim 2, wherein said first circuit is configured to further output a seventh signal that is in phase of the first signal, with a frequency that is divided by said number, and wherein said circuit branch further comprises a fourth circuit configured to integrate the seventh signal and output the fourth signal.

4. The device according to claim 1, further comprising a fifth circuit configured to perform a change in sign of said second signal before input to said third circuit.

5. The device according to claim 4, wherein said fifth circuit is controllable to perform the change in sign.

6. The device according to claim 1, wherein the fifth signal is provided by the following mathematical formula:

$$\text{Mix\_F\_offset}(t) = \text{Clk\_F}(t) * \text{I\_comp}(t) + \text{Clk\_F\_Q}(t) * \text{Q\_comp}(t)$$

wherein: Mix_F_offset (t) is the fifth signal; Clk_F (t) is the first signal; I_comp (t) is the fourth signal; Clk_F_Q (t) is, or is derived by a sign change from, the second signal (Clk_F_Q); and Q_comp (t) is the third signal.

7. The device according to claim 1, wherein the dividing number is a multiple of two.

8. The device according to claim 1, wherein the dividing number is a multiple of four.

9. The device according to claim 1, wherein said delay element is a programmable delay element.

10. The device according to claim 1, wherein the first signal is a clock signal.

11. The device according to claim 1, wherein the circuit branch further comprises:
a first compression circuit configured to compress the third signal before input to the third circuit; and
a second compression circuit configured to compress the fourth signal before input to the third circuit.

12. The device according to claim 11, wherein each of the first and second compression circuits implements a compression function configured to convert the third and fourth signals, respectively, from a triangular shape to a pseudo-sinusoidal shape.

13. A transmit chain for a baseband signal comprising the device according to claim 1.

14. The transmit chain according to claim 13, further comprising: a signal generator configured to generate the first signal; a modulator on carrier frequency configured to process the fifth signal and said baseband signal; and a power amplifier circuit coupled to an output of the modulator on carrier frequency.

15. A method for applying a frequency offset function to a first signal having a first frequency, comprising:
generating a second signal corresponding to the first signal offset by a duration equal to a first period of said first signal divided by four;
dividing the frequency of the first signal by a dividing number and then integrating the divided first signal to output a third signal and a fourth signal; and
performing a single side band mixing to combine the first signal, the second signal, the third signal and the fourth signal to output a fifth signal.

16. The method according to claim 15, further comprising generating a sixth signal that is in quadrature phase of the first signal, with a frequency that is divided by said number, and generating the third signal by integrating the sixth signal.

17. The method according to claim 16, generating a seventh signal that is in phase of the first signal, with a frequency that is divided by said number, and integrating the seventh signal to output the fourth signal.

18. The method according to claim 15, further comprising performing a change in sign of said second signal.

19. The method according to claim 15, wherein the dividing number is one of a multiple of two or a multiple of four.

20. The method according to claim 15, wherein the first signal is a clock signal.

21. The method according to claim 15, further comprising:
compressing the third signal before performing the single side band mixing; and
compressing the fourth signal before performing the single side band mixing.

22. The method according to claim 21, wherein each compressing comprises signal converting from a triangular shape to a pseudo-sinusoidal shape.

* * * * *